United States Patent [19]
Loo et al.

[11] Patent Number: 5,772,297
[45] Date of Patent: Jun. 30, 1998

[54] 3D GRAPHICS LIBRARY

[75] Inventors: Chian Yi Loo; Tur Wei Chan; Poh Huat Teo, all of Singapore, Singapore

[73] Assignee: Creative Technology, Ltd., Singapore, Singapore

[21] Appl. No.: 555,992

[22] Filed: Nov. 15, 1995

[51] Int. Cl.$^6$ .................................................. G06T 15/00
[52] U.S. Cl. ............................................................ 345/419
[58] Field of Search .................................... 395/119, 120, 395/125, 129, 130, 131; 345/419, 420, 425, 429, 430, 431

[56] References Cited

U.S. PATENT DOCUMENTS 5,276,798  1/1994  Peaslee et al. ...................... 395/130 X
5,537,224  7/1996  Suzuoki et al. ...................... 395/130 X
5,553,208  9/1996  Murata et al. ....................... 395/130 X
5,566,283  10/1996 Modegi et al. ...................... 395/130 X

*Primary Examiner*—Phu K. Nguyen
*Assistant Examiner*—Cliff N. Vo
*Attorney, Agent, or Firm*—Townsend and Townsend and Crew LLP

[57] ABSTRACT

An optimized 3D graphics library for a computer having a 3D graphics board or its equivalent is provided. The library provides a number of groups of functions which are optimized to simplify common tasks while being small enough building blocks to be used for most applications. In particular, the library provides the following groups of functions: (a) screen/window initialization, (b) primitive operations, (c) primitive properties, (d) buffer management, (e) color management, (f) queries, and (g) texture management.

10 Claims, 3 Drawing Sheets

3D GRAPHICS LIBRARY

BACKGROUND OF THE INVENTION

The present invention relates to 3D graphics boards for personal computers, and in particular to a graphics library for use in programming such boards.

Graphical operations on a computer require a tremendous amount of computation power. Separate graphics boards have been developed which use digital signal processing (DSP) chips to perform the calculation-intensive operations so that they do not have to be performed by the microprocessor on the mother board. Three-dimensional graphics add additional complexity in computations. Writing software to be executed on such graphic boards typically is a tedious process, requiring familiarity with the arithmetic operations performed by the particular board.

In many software languages, libraries are provided which perform higher level functions which are commonly used by programmers. These libraries thus eliminate the need for the programmer to write detailed code with a knowledge of the particular operating system and hardware requirements for a particular, commonly used function.

It would be desirable to have a graphics library for use with 3D graphics boards which is structured so that it provides an easy way to compute common functions, without being at a high enough level such that its applicability would be limited.

SUMMARY OF THE INVENTION

The present invention provides an optimized 3D graphics library for a computer having a 3D graphics board or its equivalent. The library provides a number of groups of functions which are optimized to simplify common tasks while being small enough building blocks to be used for most applications. In particular, the library provides the following groups of functions: (a) screen/window initialization, (b) primitive operations, (c) primitive properties, (d) buffer management, (e) color management, (f) queries, and (g) texture management.

In a preferred embodiment, a number of features are included to optimize the library for a personal computer environment. A number of the primitive properties can be disabled in order to boost performance. The disabling is provided for in an easily accessed and used mask. By disabling unneeded functions, performance can be boosted by limiting the number of calculations. Alternately, texture filtering can be disabled entirely. These features can be taken advantage of, for instance, for small features or features in the background of a particular display frame. Disabling or limiting texturing can make up to a 50% difference in throughput. The depth buffer function adds an additional 25% impact on throughput.

As an example of one optimization according to the present invention, a function cglSendStream provides an easy method for doing rendering, copying, uploading or downloading operations. The parameters include simply designating the proper addresses. Before calling this single service call to perform these functions, various variables and registers can be set to provide the desired operation and provide the performance optimizations that are desired. For instance, the mask used to enable or disable a number of functions is set by a programmer as part of the initialization for calling the service call, thus permitting the mask to be configured as desired on a service call by service call basis.

For a further understanding of the nature and advantages of the invention, reference should be made to the following description taken in conjunction with the accompanying drawings.

DESCRIPTION OF THE PREFERRED EMBODIMENT

Figure 1:
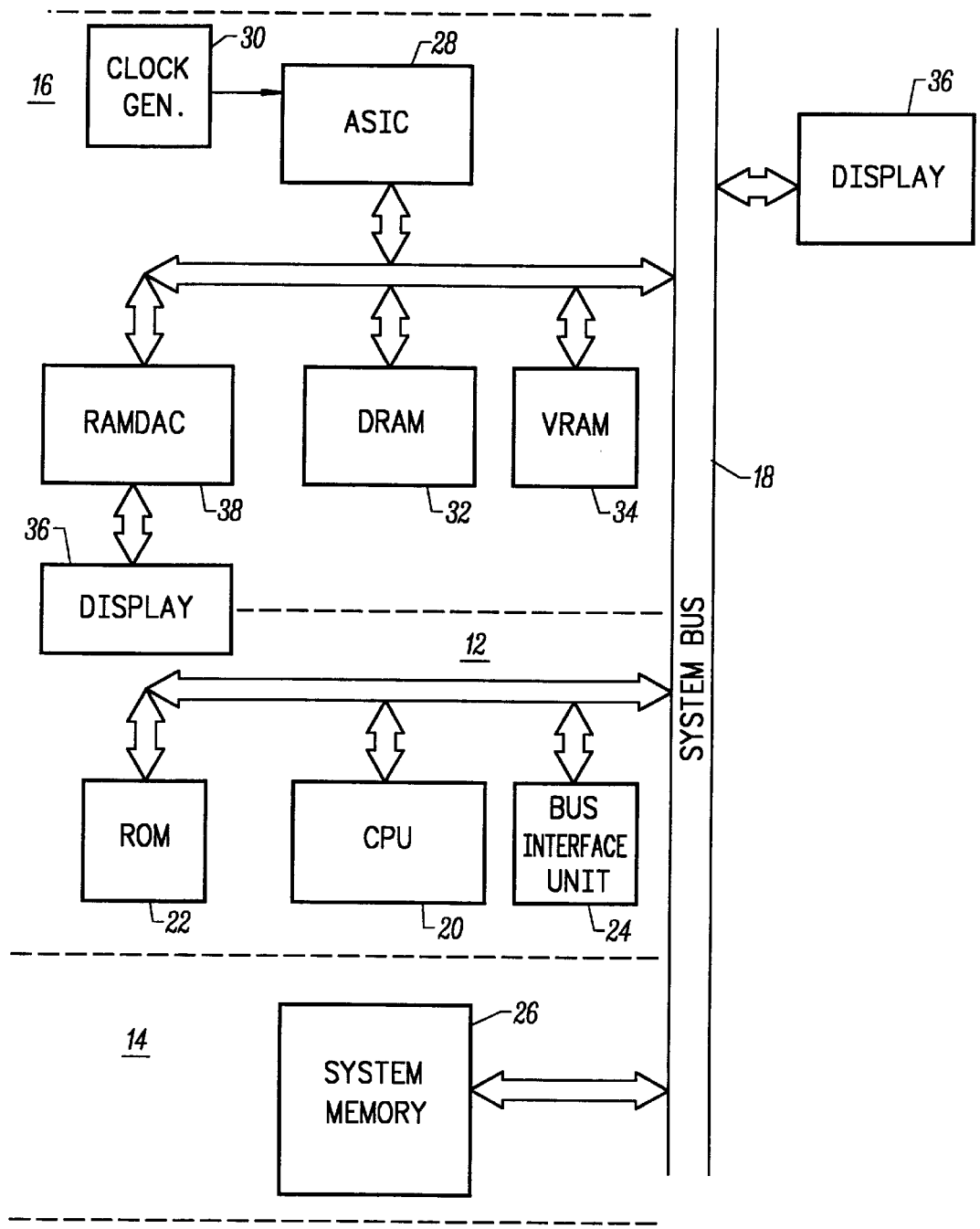
FIG. 1 is a block diagram of a computer system incorporating the present invention.

FIG. 1 shows a computer system having a mother board 12, a system memory 14, and a 3D graphics board 16, all connected to a system bus 18. The mother board 12 includes a CPU 20, a read only memory (ROM) 22 for storing the microcode, and a bus interface unit 24. The memory board 14 includes system memory 26, which may be in the form of DRAM chips. 3D graphics board 16 includes an application specific integrated circuit (ASIC) 28 which includes digital signal processing capabilities. A clock is provided by a clock generator 30. DRAM memory 32 provides local memory for the 3D processing, while a VRAM memory 34 acts as a frame buffer for data to be provided to a display 36. A RAMDAC 38 maintains the color palette and converts data from the memory into analog signals for use by display 36.

Figure 2:
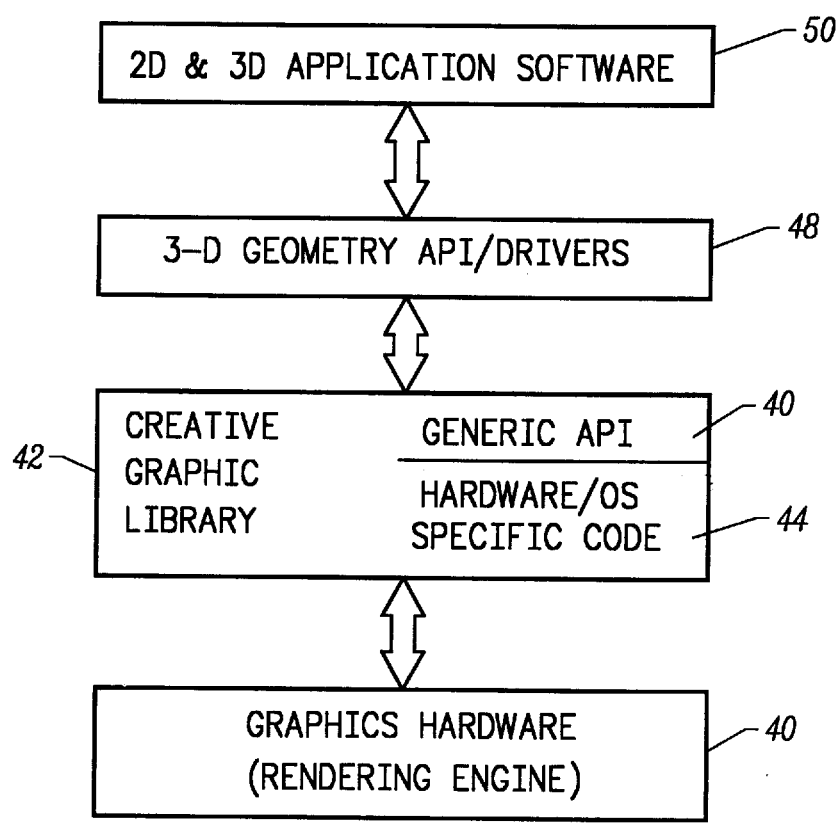
FIG. 2 is a diagram of the software hierarchy of the present invention.

FIG. 2 illustrates the hierarchy of software for use in the present invention. The software operates with graphics hardware 40 which is a rendering engine for creating the graphics on a display. In one embodiment, the graphics hardware is the 3D graphics board 16 of FIG. 1. Alternately, a mother board can include sufficient graphics power in the microprocessor to act as the graphics hardware. The Creative Graphic Library 42 interacts with the graphics hardware 40. The Creative Graphic Library (CGL) includes a lower layer hardware specific or operating system specific code 44, with a top layer being a generic application program interface (API) 46. This library can be used in conjunction with 3D geometry API and drivers 48 by 2D and 3D applications software 50.

Attached as Exhibit 1 is a developer's information pack for the CGL which sets forth a description of each of the service calls in the library. The service calls are broken into seven service groups. The service calls have been chosen to provide an optimization between simplifying often-needed functions, and providing those functions at a level useful to most application software. Examples of the service calls in each service group are discussed below.

1. Screen/Window. This group of service calls basically is an initialization grouping which allows setting up the screen configuration.

cglQueryScreen. This is a service call which can be used to detect whether the graphics subsystem is present, and query the user of the application software for the appropriate screen configuration. Included are designations of what point of the screen is the 0, 0 coordinate, and the pixel size and frequency of the screen display. In addition, the color format and whether single or double buffering is desired is requested. This call also queries whether the depth and stencil buffers are to be used and the assignment of bits to them.

cglInitScreen. The service call is used to initialize the graphics program in accordance with the designations provided cglQueryscreen.

2. Primitive Operation. This group of service calls is a grouping which allows pixels to be placed on the screen or pixels to be sent to the screen, or alternatively to be rendered or copied.

cqlSendStream. This is a service call which is used to send a stream of pixels or a block of pixels for various purposes, such as for rendering, copying, uploading or downloading. These operations can be performed using a single service call. The parameters specified for the call are the addresses of the operation blocks. This service call will look to a number of parameters which are designated by the programmer in the setup code prior to calling the service call. For example, the operation needs to be designated in this setup as either a render or a copy operation. Additionally, the number of vertices needs to be designated, along with the primitive type (drawing a point, line, triangle, etc.). Depth, stencilling and texturing must all be designated. A single mask is uniquely used to enable a variety of features, including shading, depth test, 'stencil test, alpha-blending, texture mapping, depth cue, etc. The mask is called the uPropertyEnableMask. The use of such a mask structure simplifies the program usability to optimize performance separately for each use of the service call. Reference should be made to the attached Appendix for more details on this service call and on the mask.

3. Primitive Property. This group of service calls primarily specify certain properties of different primitive operations, with the primitive operations being enabled or disabled by the mask in the cglSendStream call.

cqlSetDepthMode. This is a service call which determines the comparison function which is used for depth testing. The depth test is performed only when the depth bit is set in the enable mask of the cglSendStream call. For instance, the comparison can indicate whether a greater than, lesser than or equal comparison is to be used.

cqlSetLogicalOpsMode. This is a service call which will be performed only if the Logicalops bit in the uPropertyEnableMask in the of the cglSendStream call is set. The parameters supported include a number of logical operations, such as a NOR operation, an AND operation, NAND, a not_AND operation, etc.

4. Texture Management. This is a group consisting of a single service call for loading a texture map with the parameters including specifying the address of the map, the buffer width, the color format and whether dithering is used.

Figure 3:
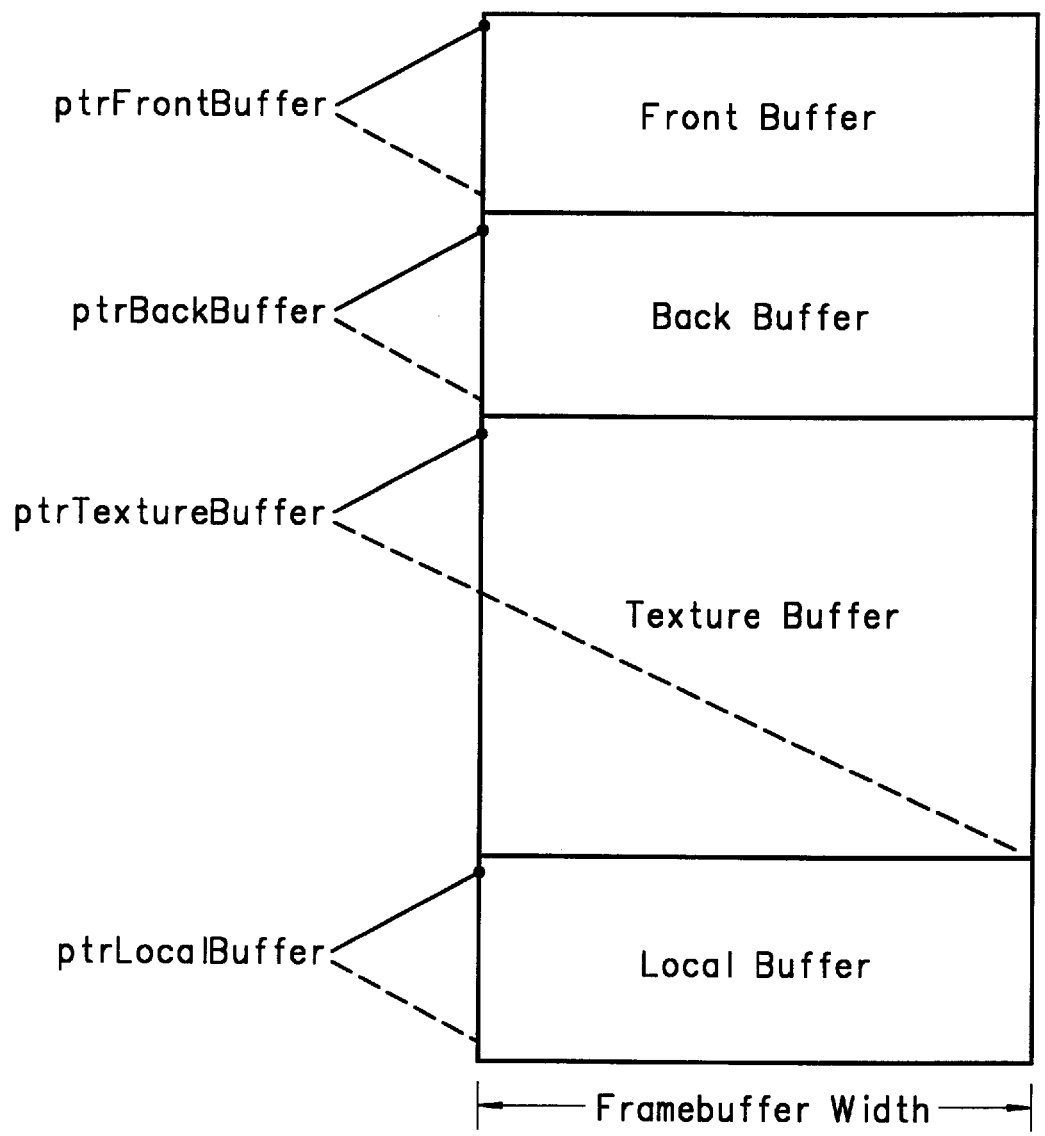
FIG. 3 is a diagram of the allocation of frame buffer memory used in the present invention.

5. Buffer Management. This group of service calls provides for easy management of the frame buffer. In particular, a number of service calls for managing the double-buffering function are included. FIG. 3 illustrates the buffer organization, with the front and back buffer being the two buffers used for double-buffering. The starting positions for pointers to the different buffer areas can be either as indicated by solid lines, or as indicated by dotted lines in FIG. 3. The texture buffer stores texture information, and if single buffering is used, it would start immediately after the front buffer in FIG. 3.

6. Color Management. This group of service calls allows for managing aspects of the color characteristics. In addition to getting a color palette and setting the parameters of the color palette, service calls are provided for a download and upload operation. Logical operations and dithering can be included as part of the downloading process.

7. Query Control. This group of service calls deals with controlling a picking mode which compares pixels against a picking region, an extent mode, where pixels are compared against an extent region, and cursor control functions.

As will be understood by those of skill in the art, the present invention may be embodied in other specific forms without departing from the spirit or essential characteristics thereof. Accordingly, the foregoing description is illustrative of embodiments of the invention, but is not limiting of the scope of the invention. Accordingly, reference should be made to the appended claims for any description of the scope of the invention.

What is claimed is:

1. A program storage device readable by a computer having hardware for performing 3D graphics operations, including at least one buffer, comprising:
   a library of functions for performing 3D graphics operations, said functions being callable in a platform independent manner, said functions provided in groups including
   a screen/window initialization group of functions,
   a primitive operation group of functions,
   a primitive property group of functions,
   a buffer management group of functions,
   a color management group of functions, and
   a query control group of functions.

2. The device of claim 1 wherein said groups of functions further includes a texture management group of functions.

3. A program storage device readable by a computer having hardware for performing 3D graphics operations, including at least one buffer, comprising:
   a library of functions for performing 3D graphics operations, said functions being callable in a platform independent manner, said functions provided in groups including
   a screen/window initialization group of functions,
   a primitive operation group of functions,
   a primitive property group of functions,
   a buffer management group of functions,
   a color management group of functions, and
   a query control group of functions;
   wherein said primitive operation group of functions includes:
     a send stream function for sending a block operation stream to perform a plurality of primitive operations in a single service call;
     a put pixel function for drawing a pixel on a display at a specified location; and
     a get pixel function for retrieving a pixel value at a specified display position.

4. The device of claim 3 wherein said send stream function includes the following parameters:
   an operation parameter indicating a render or a copy operation;
   a number of vertices;
   a primitive type;
   a property enable mask having a plurality of bits for enabling a plurality of properties of said primitive type;
   a pointer to a depth structure for writing into a depth buffer;
   a pointer to a stencil structure for writing into a pointer to a blend structure for blending a render primitive with a frame buffer's contents;
   a pointer to a texture structure for describing a texture to be applied to said render primitive;
   a pointer to a vertex array;
   a pointer to a first element of a texture array;
   a pointer to a first element of a color structure; and
   a pointer to an array of depth structures.

5. The device of claim 4 wherein said property enable mask comprises:

a shade bit for enabling Gouraud shading;
a depth bit for enabling a depth test;
a stencil bit for enabling a stencil test;
a blend bit for enabling alpha blending;
a texture bit for enabling texture mapping;
a depthcue bit for enabling depth cuing;
a logicalops bit for enabling logical operations;
a bitmask bit for enabling a bitmask;
a stipple bit for enabling area stippling; and
a perspective bit for enabling texture perspective.

6. A program storage device readable by a computer having hardware for performing 3D graphics operations, including at least one buffer, comprising:
a library of functions for performing 3D graphics operations, said functions being callable in a platform independent manner, said functions including
a send stream function for sending a block operation stream, said send stream function including
a primitive type; and
a property enable mask having a plurality of bits for enabling a plurality of properties of said primitive type.

7. A program storage device readable by a computer having hardware for performing 3D graphics operations, including at least one buffer, comprising:
a library of functions for performing 3D graphics operations, said functions being callable in a platform independent manner, said functions including
a send stream function for sending a block operation stream, said send stream function including
a primitive type; and
a property enable mask having a plurality of bits for enabling a plurality of properties of said primitive type;
wherein said property enable mask comprises:
a shade bit for enabling Gouraud shading;
a depth bit for enabling a depth test;
a stencil bit for enabling a stencil test;
a blend bit for enabling alpha blending;
a texture bit for enabling texture mapping;
a depthcue bit for enabling depth cuing;
a logicalops bit for enabling logical operations;
a bitmask bit for enabling a bitmask;
a stipple bit for enabling area stippling; and
a perspective bit for enabling texture perspective.

8. A program storage device readable by a computer having hardware for performing 3D graphics operations, including at least one buffer, comprising:
a library of functions for performing 3D graphics operations, said functions being callable in a platform independent manner, said functions including
a send stream function for sending a block operation stream, said send stream function including
a primitive type; and
a property enable mask having a plurality of bits for enabling a plurality of properties of said primitive type;
wherein said send stream function includes the following parameters:
an operation parameter indicating a render or a copy operation;
a number of vertices;
a primitive type;
a property enable mask having a plurality of bits for enabling a plurality of properties of said primitive type;
a pointer to a depth structure for writing into a depth buffer;
a pointer to a stencil structure for writing into a pointer to a blend structure for blending a render primitive with a frame buffer's contents;
a pointer to a texture structure for describing a texture to be applied to said render primitive;
a pointer to a vertex array;
a pointer to a first element of a texture array;
a pointer to a first element of a color structure; and
a pointer to an array of depth structures.

9. A program storage device readable by a computer having hardware for performing 3D graphics operations, including at least one buffer, comprising:
a library of functions for performing 3D graphics operations, said functions being callable in a platform independent manner, said functions including
a send stream function for sending a block operation stream, said send stream function including
a primitive type; and
a property enable mask having a plurality of bits for enabling a plurality of properties of said primitive type;
wherein said functions are provided in groups including
a screen/window initialization group of functions,
a primitive operation group of functions,
a primitive property group of functions,
a buffer management group of functions,
a color management group of functions, and
a query control group of functions.

10. A program storage device readable by a computer having hardware for performing 3D graphics operations, including at least one buffer, comprising:
a library of functions for performing 3D graphics operations, said functions being callable in a platform independent manner, said functions provided in groups including
(a) a screen/window initialization group of functions,
(b) a primitive property group of functions,
(c) a buffer management group of functions,
(d) a color management group of functions,
(e) a query control group of functions,
(f) a texture management group of functions, and
(g) a primitive operation group of functions, said primitive operation group of functions including
(1) a put pixel function for drawing a pixel on a display at a specified location; and
(2) a get pixel function for retrieving a pixel value at a specified display position
(3) a send stream function for sending a block operation stream to perform a plurality of primitive operations in a single service call, said send stream function includes the following parameters:
(A) an operation parameter indicating a render or a copy operation;
(B) a number of vertices;
(C) a primitive type;
(D) a pointer to a depth structure for writing into a depth buffer;
(E) a pointer to a stencil structure for writing into
(F) a pointer to a blend structure for blending a render primitive with a frame buffer's contents;
(G) a pointer to a texture structure for describing a texture to be applied to said render primitive;
(H) a pointer to a vertex array;
(I) a pointer to a first element of a texture array;
(J) a pointer to a first element of a color structure;

(K) a pointer to an array of depth structures; and
(L) a property enable mask having a plurality of bits for enabling a plurality of properties of said primitive type, said property enable mask comprising
  (i) a shade bit for enabling Gouraud shading;
  (ii) a depth bit for enabling a depth test;
  (iii) a stencil bit for enabling a stencil test;
  (iv) a blend bit for enabling alpha blending;
  (v) a texture bit for enabling texture mapping;
  (vi) a depthcue bit for enabling depth cuing;
  (vii) a logicalops bit for enabling logical operations;
  (viii) a bitmask bit for enabling a bitmask;
  (ix) a stipple bit for enabling area stippling; and
  (x) a perspective bit for enabling texture perspective.

\* \* \* \* \*